April 30, 1963
G. N. LUKAS
3,087,736
COLLET OPERATOR
Filed March 20, 1961
2 Sheets-Sheet 1
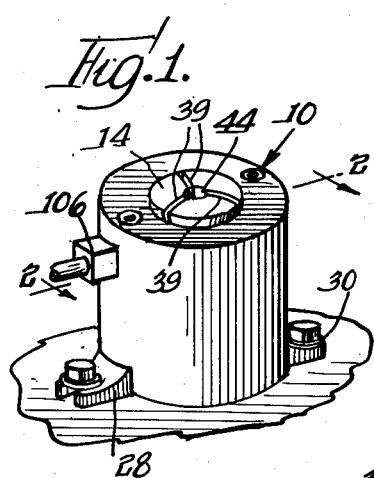
Fig. 1.
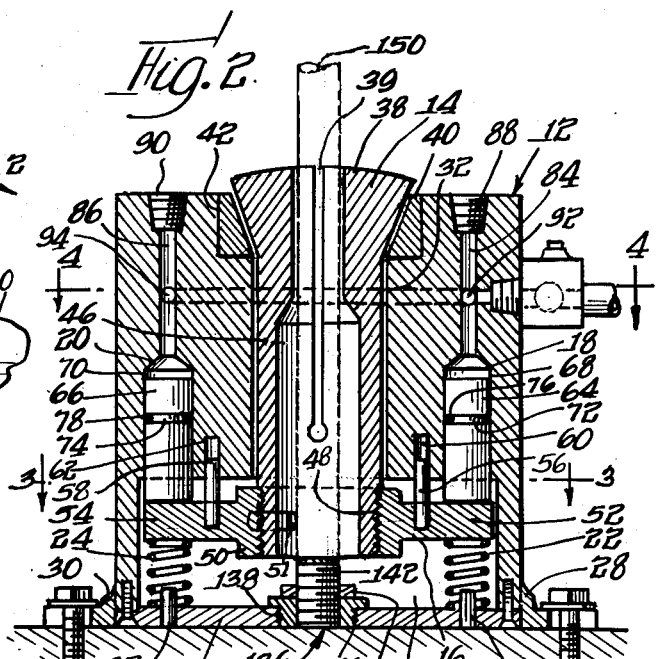
Fig. 2.
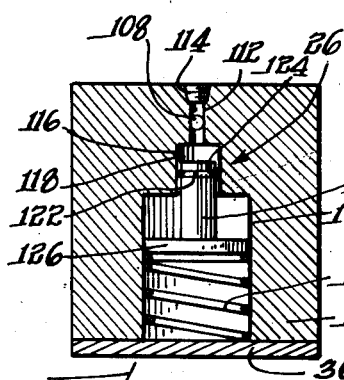
Fig. 5.
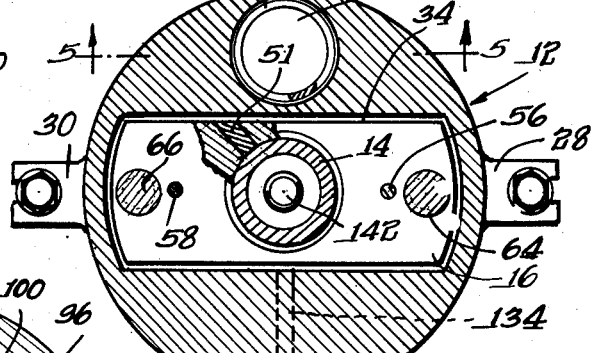
Fig. 3.
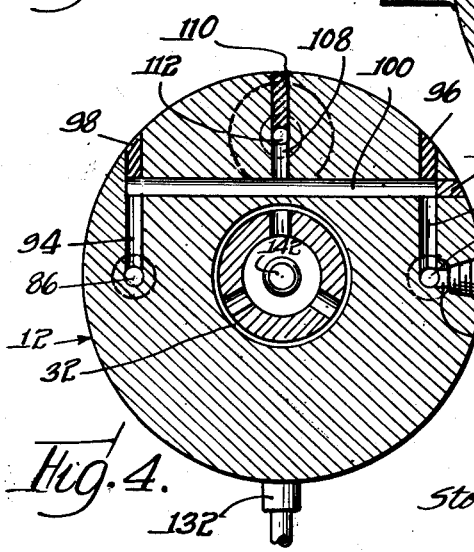
Fig. 4.
INVENTOR.
George N. Lukas
BY Stone, Nierman, Burmeister & Zummer
Attys April 30, 1963 G. N. LUKAS 3,087,736
COLLET OPERATOR
Filed March 20, 1961 2 Sheets-Sheet 2
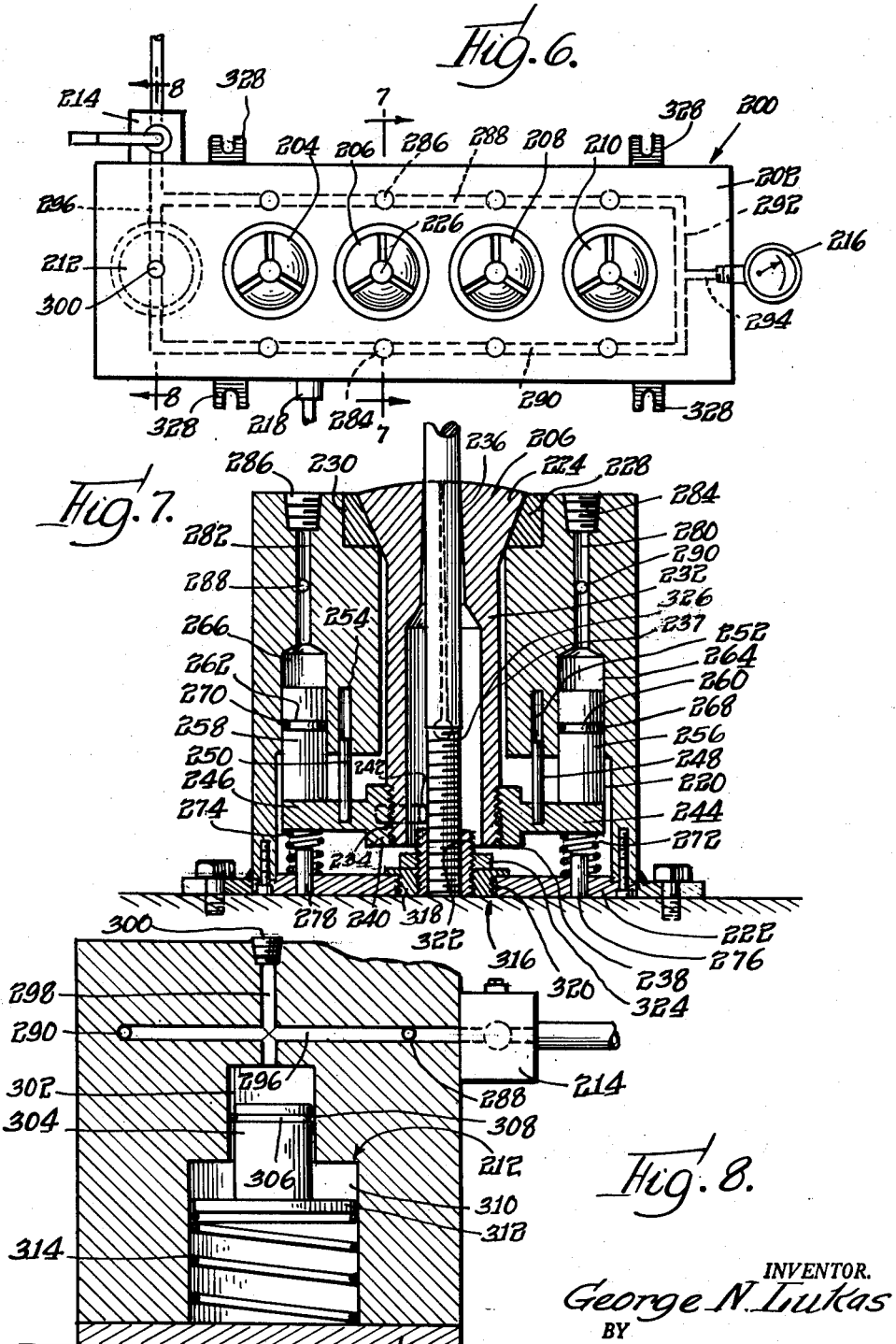
INVENTOR.
George N. Lukas
BY
Stone Nieman, Burmeister & Zummu
attys.

United States Patent Office 3,087,736
Patented Apr. 30, 1963

3,087,736
COLLET OPERATOR
George N. Lukas, 4525 N. Clark St., Chicago, Ill.
Filed Mar. 20, 1961, Ser. No. 96,928
20 Claims. (Cl. 279—4)

This invention relates to an improved collet operator and more particularly to a collet operator which utilizes a fluid under pressure and the collet is economical to manufacture.

Automatic collet operators are in use primarily in machine shops to hold a piece of bar stock, and more particularly, a round piece of bar stock during the working of the bar stock. Ordinarily, collets are used in lathes for holding rotating pieces of bar stock. However, collets, in some instances, are used to hold a round piece of bar stock when the bar stock is being cut in a milling machine or being drilled. Collet operators using fluid pressure to operate the collet, that is, lock the bar stock in the collet, are ordinarily quite expensive inasmuch as the operators are rather complex and require precision-machined parts in the construction of the collet operator. It is therefore one of the principal objects of the hereindisclosed invention to provide a collet operator which is simply and economically constructed and requires only a minimum of precision machining in the construction of the collet.

It is another object of the present invention to provide a collet operator which is capable of locking a piece of bar stock or machined part in the collet; then mounting the operator in one machine for making a cut or performing a certain operation on the work piece, and then removing the work piece and the collet operator from that machine, transferring it to another machine for further operation on the work piece without removing the work piece from the collet operator, then returning the workpiece and collet operator to the original machine for further operation.

It is a further object of the hereindisclosed invention to provide a collet operator which positions a work piece relative to the collet in order to provide uniformity of machining of several work pieces.

It is a further object of the instant invention to provide a collet operator which allows a coolant to enter the collet operator and flow through the collet operator into a collet in order to provide a coolant for a work piece held by the collet.

It is a still further object of the present invention to provide a collet operator which is capable of operating a plurality of collets in a single device to hold a plurality of work pieces in order to do ganged operations, such as, ganged milling on work pieces held in the collets.

It is still another object of this invention to provide a collet operator for simultaneously operating a plurality of collets, which collets are capable of locking a plurality of work pieces in position, removing the source of power from the collet operator and holding the work pieces locked in their respective collets over an extended period of time.

Other objects and uses of the present invention will become readily apparent to those skilled in the art upon a perusal of the accompanying specification in light of the drawings in which:

FIGURE 1 is a perspective view of a single collet operator embodying the hereindisclosed invention;

FIGURE 2 is a cross sectional view taken on line 2—2 of FIGURE 1, showing a portion of the inner construction of the single collet operator;

FIGURE 3 is a cross sectional view taken on line 3—3 of FIGURE 2 showing the construction of an actuator bar in the collet operator;

FIGURE 4 is a cross sectional view taken on line 4—4 of FIGURE 2 showing porting in the collet operator;

FIGURE 5 is a cross sectional view taken on line 5—5 of FIGURE 3 showing the construction of an accumulator in the collet operator;

FIGURE 6 is a plan view of a multiple collet operator embodying the hereindisclosed invention;

FIGURE 7 is a cross sectional view taken on line 7—7 of FIGURE 6 showing the interior construction of a portion of the multiple collet operator shown in FIGURE 6; and FIGURE 8 is a cross sectional view taken on line 8—8 of FIGURE 6 showing the construction of an accumulator in the multiple collet operator shown in FIGURE 6.

Referring now to the drawings and especially to FIGURES 1 through 5, a single collet operator generally indicated by numeral 10 is shown therein. The collet operator 10 generally consists of a base 12, a conventional collet 14 moveably mounted in the base, an actuator bar 16 removably connected to said collet 14, operator cylinders 18 and 20 connected to the actuator bar to move the collet, return springs 22 and 24 operatively engaging the actuator bar to return the collet to an open position, and an accumulator 26 connected to the operator cylinders.

Considering now the operator 10 in more detail, it may be seen that the base 10 is generally cylindrical and has a pair of mounting lugs 28 and 30 on the outside for positioning the operator on a bed for a milling machine or some other such similar device. The base has an axial collet aperture 32 through its center which opens into an actuating bar recess 34 in the bottom of the base. The recess 34 has a floor 36 covering the recess, which floor is in sealing engagement with the base 12, in order to seal closed the recess at the bottom for holding a coolant as will be described hereinafter.

The collet 14 is conventional in construction, in that it has a head 38 with three equiangularly spaced slots 39, which head has tapered sides engageable with a collet seat 40. The collet seat 40 is fixed in a collet seat aperture 42 at the top of the base. The collet also has a work piece holding aperture 44 in its center which extends along the length of a shank 46 which shank has a threaded end 48.

As mentioned above, the actuator bar 16 is removeably attached to the collet. The actuator bar 16 includes a boss 50 which is internally threaded to mate with the threaded end portion 48, so that the collet is threadably connected to the actuator bar. The boss has a nylon plug 51 fixed therein, which plug engages the threaded end of the collet to hold securely the collet relative to the boss. The actuator bar also has a pair of outwardly extending coplanar arms 52 and 54 integral with the boss, which arms 52 and 54 have guide pins 56 and 58, respectively, fixed therein. The guide pins are slidably mounted in pin apertures 60 and 62, respectively, in the base to prevent the actuator bar from rotating relative to the base, but allow the actuator bar to move axially within the base.

The cylinders 18 and 20 include identical pistons 64 and 66, respectively, which pistons 64 and 66 are moveably mounted in respective cylinder apertures 68 and 70 within the base 12. The pistons 64 and 66 have grooves 72 and 74, respectively, and O-rings 76 and 78 are mounted in the grooves 72 and 74, respectively. The pistons 64 and 66 are in engagment with the arms 52 and 54, respectively, so that, as the pistons are pushed down by a hydraulic fluid under pressure, the actuator bar is pushed down against the springs 22 and 24 which engage the arms 52 and 54, respectively, to pull down the collet 14, so that the head 38 engages the block 40 to push together the slotted head thereby placing the collet in a gripping attitude. When the pressure of the hydraulic fluid on the piston is relieved, the springs 22 and 24 which are held in position by spring pins 80 and 82, respectively, push upward the collet and the pistons 64 and 66 so that the collet is placed in a released position and the pistons 64 and 66 are forced into their respective cylinder apertures. It may be noted that the spring pins 80 and 82 are fixed in the floor 36 to prevent the springs from sliding relative to the floor, thereby acting as guides for the springs 22 and 24 which provide the return means for the actuator bar and associated members of the collet operator.

Considering now the porting of the instant device, it may be seen that cylinder ports 84 and 86 are connected to their respective cylinder apertures 68 and 70. The cylinder ports 84 and 86 extend to the top of the base and are sealingly closed by threaded plugs 88 and 90, respectively. These plugs 88 and 90 are removable in order to clean out the cylinder ports and to drain and relieve pressure in the event that it is necessary to do so. The cylinder ports 84 and 86 have respective lead ports 92 and 94 connected thereto. It may be seen that the ports 92 and 94 are made by drilling holes through the base and plugging a portion of the ports by plugs 96 and 98, respectively. A connecting port 100 connects the two lead ports 92 and 94 to provide a passage between the operator cylinders for equalizing the pressure in the cylinders. The connecting port 100 is also made by drilling a hole into the base and placing a plug 102 in the port to seal off the port from outside the base. An inlet port 104 is connected to the lead port 92 as shown in FIGURE 4. A valve 106 is connected to the inlet port 104 and to a source of hydraulic fluid under pressure which source is not shown in this instance. The valve 106 controls the flow of hydraulic fluid under pressure into the operator cylinders and into the accumulator as will be seen hereinafter. The valve 106 also controls the flow of fluid out of the base, thereby regulating the operation of the collet.

The accumulator 26 is also connected to the connecting port 100, an accumulator lead port 108 connects into the conecting port 100. The port 108 is also formed in the base by drilling a hole into the base and fixing a plug 110 into a portion of the port to seal the port from the outside. The lead port 108 connects into an accumulator port 112, which accumulator port has one end sealed by a threaded plug 114 to provide an easy access for bleeding the port or cleaning it. The port 112 opens into an accumulator cylinder 116 of accumulator 26. The cylinder has a cylinder aperture 118 which is similar to the cylinder apertures 68 and 70 of the cylinders 18 and 20. A piston 120 is moveably mounted in the cylinder aperture 118. The piston has a groove 122 which groove has an O-ring 124 mounted therein in engagement with the cylinder wall to seal the space between the cylinder wall and the piston. The piston 120 has a spring plate 126 fixed on one end. Plate 126 is moveably mounted in a piston plate aperture 128 in base 12 which aperture opens onto the cylinder aperture 118. A constant force accumulator spring 130 is positioned in aperture 128 between floor 36 and the piston plate 126 in order to urge continually at a constant force the piston 120 upward into cylinder aperture 118 for reasons which will become apparent hereinafter.

The base 12 also has a coolant inlet 132 fixed to one side, which coolant inlet connects to a coolant port 134. The coolant port opens into the actuator bar aperture 34 as may be seen in FIGURE 3. The coolant inlet 132 is connected to a source of coolant, which source is not shown in this instance, to provide a coolant flow into the interior of the base and upward along the collet.

The collet operator has an adjustable stock stop 136 mounted on floor 36 below and aligned with aperture 44 in the collet. The stock stop includes a stock plug 138 which is threadedly and sealably mounted in an aperture 140 of floor 36. The plug 138 is threaded internally and receives a threaded riser 142 which is locked into position relative to the plug 138 by a lock nut 144. The stock stop may be adjusted vertically relative to the floor to hold a work piece in a desired position by the adjustment of the riser relative to the stock plug, and then the riser is locked into position by the lock nut.

It is apparent that though one size of collet 38 is shown, the collet may be readily removed by simply rotating the collet to loosen it from the internally threaded boss 50 and replaced with a collet of an appropriate size.

In normal operation, the stock stop is first adjusted to an appropriate height. It should be noted that riser 142 of the stock stop may be of any appropriate length depending upon the length of the work piece. Collet 14 of an appropriate size is connected to the actuator bar. The operator may be secured to a machine by use of the lugs 28 and 30 as may be desired. A work piece such as piece 150 shown in dotted form in FIGURE 2 is positioned in the collet in engagement with the end of the riser. When the work piece is in position, the valve 106 is opened to connect the inlet port with a source of hydraulic fluid under pressure.

Hydraulic fluid under pressure flowing into the porting system in base 12 actuates the operator cylinder and the accumulator. The fluid flows into the inlet port through valve 106. From the inlet port, the fluid flows into lead port 92 and into cylinder port 84. The connecting port is supplied through the lead port, and the connecting port connects the accumulator and cylinder 20 with the source of hydraulic fluid through ports 108 and 112 and ports 94 and 86 respectively. The hydraulic fluid under pressure forces piston 120 of the accumulator downward against the force of spring 130 thereby displacing the spring and filling up a portion of cylinder 118. The fluid under pressure also displaces the piston 64 and 66 to force downward or toward the floor 36 the actuator bar against springs 22 and 24. The movement of the bar 16 relative to the block 40 compresses head 38 in order to lock the work piece into the collet. The collet operator which is connected to the bed of a milling machine or other similar machine is then appropriately positioned for forming the work piece held in the collet.

It may be appreciated that the valve 106 is closed and it is no longer necessary to apply hydraulic fluid under pressure to the device. In the event that there is a leak so that there is a loss of hydraulic fluid in either of the operator cylinders for a loss in pressure, the fluid contained in accumulator 26 is pushed into the system through port 112 into port 108 and then into the connecting port 100 where the fluid is delivered to the two operator cylinders. Thus, the collet is maintained in a closed or gripping position without being connected to a source of a hydraulic fluid under pressure. It may be appreciated that by an appropriate selection of the size and design of spring 130 in light of the diameter of piston 120, any selected pressure may be maintained in the operator cylinders. Though a constant force spring is used herein, a spring having a variable force with displacement may be used in as much as the displacement of the spring is small.

While the work piece is being formed, a coolant is supplied to the coolant inlet 132 then through port 134 and into the aperture 34. The coolant flows through the interior of the collet and out through the slots 39 along the work piece thereby cooling the work piece. It may be appreciated that the coolant may be the cutting fluid which is supplied to the work piece and the source of supply may be the source of supply for the cutting fluid in the milling machine in this instance or other similar machine.

After appropriate forming is completed on one machine, the operator may be released from the bed of the milling machine in this instance, and removed to another machine, for instance a drill press, where further work may be done on the work piece while the work piece is locked in the collet operator. The collet operator and work piece may then be returned to the milling machine, still locked in position, or another machine for further operation.

When it is desired to release the work piece, it is necessary only to open the valve 106 to release the hydraulic fluid. When the valve is open and there is no longer fluid under pressure being forced into the valve 106, the spring 130 pushes upward against plate 126 to expel the hydraulic fluid under pressure out of the cylinder 118 and the springs 22 and 24 push upward the actuator bar. Thus, the pistons 64 and 66 are forced into cylinders 68 and 70, respectively, to force the hydraulic fluid out of the cylinders through the appropriate porting, and the collet is moved upward, so that the head 38 disengages the block 40. Thereby, the natural resilience of the collet head spreads the slotted head away from the work piece to release the work piece. Thus, the work piece may be readily removed from the collet.

Referring now to FIGURES 6, 7 and 8 which show a multiple collet operator generally indicated by numeral 200, it may be seen that the present invention is particularly well-adapted to a multiple arrangement of collets as well as a single collet arrangement. The multiple collet operator 200 generally consists of a base 202 which has a plurality of collets 204, 206, 208 and 210 operatively mounted in the base, operating means connected to each of said collets, an accumulator 212 connected by appropriate porting to the collet operating means, a valve 214 controlling the egress and ingress of hydraulic fluid under pressure to the base, a pressure gauge 216 connected to the accumulator and collet operating means, and a coolant inlet 218 connected to the interior of the base.

The base 202 has an enlarged actuator bar recess 220 in its bottom with a floor 222 sealingly connected to the base in order to seal off the actuator bar recess. Each of the collets 204, 206, 208 and 210 is connected to an operating means for operating the collet. Each of the operating means is identical in construction to each other operating means so that the operating means shown in FIGURE 7 for collet 206 is identical for each other collet. The collet 206, as does each other of the aforementioned collets and collet 14, has a head 224 which has a tapered outer periphery and three slots 226 which allow the head to be compressed by movement relative to a collet operator block 228 which is mounted in a block aperture 230 in the top of base 202. The collet 206 has a shank 232 integral with the head which shank has a threaded portion 234 on the end opposite the head. The collet has a work-holding aperture 236 extending through its center for receiving a workpiece.

An actuator bar 238, identical in construction to the above-described actuator bar 16, is removably connected to the collet 206. In this instance, the actuator bar 238 has a boss 240 which is internally threaded to receive the threaded portion 234 of the collet. A nylon plug 242 in the boss serves to lock the collet to the boss. The actuator bar also has a pair of coplanar arms 244 and 246 extending away from the boss 240 in opposite directions. The arms 244 and 246 have guide pins 248 and 250, respectively, fixed therein, which guide pins are movably mounted in guide pin apertures 252 and 254, respectively.

The arms 244 and 246 are connected to operator cylinders 264 and 266, respectively, which cylinders provide an operating means for moving the actuator bar and the connected collet. The cylinders 264 and 266 include pistons 256 and 258, respectively, which pistons have grooves 260 and 262, respectively, and the pistons have the same diameters. The respective pistons 256 and 258 which are in engagement with arms 244 and 246 the same effective distance from the center of the collet 206, have O-rings 268 and 270 mounted in grooves 260 and 262, respectively, for engagement with the respective cylinder walls in the base to form a seal therebetween.

In addition to being in engagement with the pistons 256 and 258, the arms 244 and 246 respectively are in engagement with springs 272 and 274, respectively, which springs provide a return means for the actuating bar. As may be seen in FIGURE 7, the springs are positioned between the floor 222 and the actuating bar in order to urge constantly the collet out of engagement with the block 228. The springs 272 and 274 are held in position by pegs 276 and 278, respectively, which pegs are fixed in the floor 222.

The cylinders 264 and 266 are connected to cylinder ports 280 and 282, respectively. The ports 280 and 282 have plugs 284 and 286 in their respective ends to close the ends of the ports. An inner port 288 extends along one side of the base to connect the cylinder ports of all of the collet operating means on that side of the base. Thus, port 286 is connected to port 288. Another port, that is an outer port 290, is connected to cylinder port 280 and connects all of the ports of the collet operating means on the other side of the base. The ports 288 and 290 are connected at one end by a connecting port 292. The connecting port 292 has a gauge port 294 opening thereon which is connected to gauge 216. An inlet port 296 is connected to valve 214, and the inlet port also connects the ports 288 and 290 at their other ends, so that each piston of a pair of pistons connected to a given actuator bar exert the same force on the actuator bar.

The inlet port 292 has an accumulator port 298 connecting therewith, which accumulator port has an accumulator port plug 300 threadedly mounted in the top of the base to close off the top of port 298 as may be seen in FIGURE 8. The accumulator port 298 opens into an accumulator cylinder aperture 302 which has slideably mounted therein a piston 304. The piston 304 has a groove 306 in its outer surface which groove has an O-ring 308 mounted therein to provide a seal between the piston 304 and the associated cylinder wall formed by the base. The piston 304 extends into a spring recess 310 which is an enlarged aperture. A piston plate 312 is fixed to the piston 304 and is moveable within the aperture. A constant force spring 314 is positioned in the aperture between the piston plate 312 and the floor 222 in order to urge constantly the piston upward and to complete accumulator 212.

Associated with each of the collets there is a stock stop, one of which is shown as stock stop 316 in FIGURE 7 and is identical to each other stock stop in operator 200. Stock stop 316 includes a threaded plug 318 which is threadedly mounted in a threaded aperture 320 of floor 222. The plug 318 has a threaded riser 322 threadedly mounted in the plug and a lock nut 324 mounted on the riser to hold the riser relative to the plug. The riser 322 has a threaded rod 326 threadedly mounted within the riser to provide a convenient stop for a work piece. The operation of stock stop 316 is similar to the above described stock stop 136 though stock stop 136 does not have a threaded rod such as rod 326.

A plurality of lugs 328 is fixed to the base 202 to provide a convenient means for mounting the base on a metal forming machine and locking it into position relative to a portion of the machine.

The operation of the multiple collet operator 200 is similar to the operation of the single collet operator. The stock stop for each of the collets 204, 206, 208 and 210 is adjusted to an appropriate height, and a work piece is positioned in each of the collets. With the work pieces in position, a hydraulic fluid under pressure is admitted into the port system of base 202 through valve 214.

As the hydraulic fluid under pressure enters the inlet port 296, the fluid flows into ports 288 and 290 as well as into accumulator port 298. As the fluid under pressure continues to flow into the port system, the pistons in each of the collet operator means are expanded out of their respective cylinders against the force of the return springs, and the piston 304 is pushed out against the force of spring 314. As the pistons are extended the collet heads engage their respective collet blocks and clamp onto the respective work pieces as shown for collet 206 in FIGURE 7. As the pressure is increased the pressure in the port system is indicated on pressure gauge 216. When sufficient pressure within the port system is attained, the valve 214 is then closed. It may be appreciated that at this point the hydraulic line may be removed from the valve and the base may be moved as desired.

If the base is connected to a milling machine bed by lugs 328, the work pieces may be gang milled as desired. After the milling is completed, the operator 202 may be released from the bed and the parts may be drilled on a multiple spindle drill or some other work may be done to the work pieces held in collets 204, 206, 208 and 210.

It is readily apparent that in the event that there should be any need for an additional coolant for the parts due to the type of work, a coolant is supplied through the coolant entrance 218. Thus, the coolant flows into the actuator bar aperture 220, and flows up along the collet and out along the collet head slots, such as, slots 226 of collet 206.

It is also evident that in the event there is any leak in the system and a small bit of hydraulic fluid should escape, the accumulator 212 constantly provides hydraulic fluid under pressure to the system thereby maintaining the pressure in the system. Thus, the collets are constantly in their locked position. Should the instant device be kept in a locked position over an extended period of time, it is a simple matter for an operator to determine whether the pressure in the operator is dropping off by inspecting the pressure gauge 216. Should the pressure gauge 216 show that there is a decrease in pressure in the system, it is a simple matter to reconnect the valve 214 to a source of hydraulic pressure in order to build up again the pressure nad replenish the accumulator.

From the foregoing it is readily apparent that the instant device has numerous advantages, one of which is that a plurality of parts may be locked into position relative to each other so that they may be worked on as a unit and the patrs may be transferred from one position to another without changing their relations.

It is also evident that a collet operator embodying the present invention may be oconomically manufactured. The porting and the apertures for the cylinders in the base may be made by a simple drilling operation and in a few instances reaming may be done. The remaining parts are simple to manufacture as is self-evident from the disclosure.

While specific embodiments of the hereindisclosed invention have been shown and described herein, it is to be expressly understood that those skilled in the art may make various modifications and changes without departing from the spirit and scope of the present invention. It is to be expressly understood that the instant invention is limited only by the appended claims.

What is claimed is:

1. A collet operator for use with a hydraulic fluid under pressure comprising, in combination, a base having a top and a bottom, said base having an actuator bar recess in its bottom, an operator block mounted in the top of said base, a collet mounted in said base engageable with said operator block to cooperate with said operator block to provide a gripping action by the collet, said collet having a hollow center and a threaded portion at one end, an actuator bar positioned in the actuator bar recess and threadedly connected to the threaded portion of the collet, a nylon plug fixed to said actuator bar in engagement with the threaded portion of said collet to hold the collet relative to the actuator bar, said actuator bar including a pair of outwardly extending arms, a guide mounted on each of said arms in engagement with the base to prevent rotation of the actuator bar relative to said base, a piston connected to each of said arms for forcing the collet into engagement with the operator block to actuate the gripping action by the collet, each of said pistons being slideably mounted in a cylinder in the base and each piston having the same size as the other piston, each of said pistons having a groove, an O-ring mounted in the groove of each of said pistons for sealing the space between each of the pistons and its respective cylinder, a cylinder port communicating with each cylinder and extending to the top of said base, a cylinder port plug sealingly closing each of said cylinder ports at the top of the base, a connecting port in said base providing communication between said cylinder ports to equalize the pressure of a hydraulic fluid in the cylinders, a pressure indicating means connected to said connecting port, an inlet port in said base connected to said connecting port, a valve connected to said inlet port for controlling the flow of fluid through the inlet port, an accumulator port communicating with the connecting port, an accumulator cylinder in said base communicating with the accumulator port, an accumulator piston slideably mounted in said accumulator cylinder, said accumulator cylinder having a groove, an accumulator O-ring mounted in the groove of said accumulator piston for sealing the space between the accumulator piston and the accumulator cylinder, a plate connected to said accumulator piston, said plate being moveable within said base, a constant force spring engaging the plate and constantly urging the accumulator piston into the accumulator cylinder, a floor mounted in sealing engagement with the base to close the actuator bar recess, a return spring mounted in engagement with each of the arms of the actuator bar and the floor constantly urging the actuator bar toward the top of the base to move the collet into a release position, a peg cooperative with each of said springs mounted on the floor to maintain the springs in position in engagement with the respective arms of the accumulator bar, a plug sealingly threadedly mounted in the floor, a threaded riser adjustably mounted in the plug for regulating the position of a work piece relative to the collet, and a coolant inlet mounted in said base communicating with the actuator bar recess, whereby a hydraulic fluid under pressure is supplied to the inlet port to the cylinders and the accumulator cylinder thereby extending the pistons against their respective springs to move the collet into a gripping position, and the valve is closed to hold the collet in a gripping position while the accumulator piston urged into the accumulator cylinder by the constant force spring maintains a constant pressure in the cylinders.

2. A collet operator for use with a hydraulic fluid under pressure comprising, in combination, a base having a top and a bottom, said base having an actuator bar recess in the bottom, an actuator bar mounted in said actuator bar recess, a collet having a threaded portion mounted in said base and being threadedly connected to the actuator bar, said actuator bar including a pair of outwardly extending arms, a piston connected to each of said arms for forcing the collet into a gripping position, each of said pistons being slideably mounted in a cylinder in the base, each of said pistons having the same size as the other pistons, a cylinder port communicating with each of said cylinders, a connecting port in said base providing communication between said cylinder ports to equalize the pressure of a hydraulic fluid in said cylinders, an inlet port in said base connected to said connecting port, a valve connected to said inlet port for controlling the flow of hydraulic fluid through the inlet port, an accumulator connected to said connecting port, a floor mounted on the bottom of said base to close the actuator bar recess, a return spring mounted in engagement with each of the arms of the actuator bar and the floor constantly urging the actuator bar toward the top of the base to move the collet into a release position, whereby a hydraulic fluid under pressure is supplied through the inlet port to the cylinders and the accumulator, thereby extending the pistons against their respective springs to move the collet into a gripping position, and the valve is closed to hold the collet in a gripping position while the accumulator maintains a constant pressure in the cylinders.

3. A collet operator for use with a hydraulic fluid under pressure comprising, in combination, a base having a top and a bottom, a collet mounted on said base and cooperative therewith to provide a gripping action by the collet, said collet having a hollow center and a threaded portion at one end, an actuator bar positioned in the bottom of said base and threadedly connected to the threaded portion of said collet, said actuator bar including a pair of outwardly extending arms, a piston connected to each of said arms for forcing the collet into a gripping action, each of said pistons being slideably mounted in a cylinder in the base and each piston having the same size as the other piston, each of said pistons having a groove, an O-ring mounted in the groove of each of said pistons for sealing the space between each of the pistons and its respective cylinder, a cylinder port communicating with each of said cylinders, a connecting port in said base providing communication between said cylinder ports to equalize the pressure of a hydraulic fluid in said cylinders, an inlet port in said base connected to said connecting port, and spring means connected to said actuator bar constantly urging the collet to a release position, whereby a hydraulic fluid under pressure is supplied through the inlet port to the cylinders thereby extending the pistons against the spring means to move the collet into a gripping position.

4. A collet operator for use with a fluid under pressure comprising, in combination, a base, a collet moveably mounted in said base, an actuator bar removeably connected to said collet for actuating said collet, a pair of balanced operator cylinders operatively connected to said actuator bar, said cylinders being balanced for applying an equal force to the actuator bar, and return means for returning the collet to a release position when the operator cylinders are de-energized.

5. A collet operator for use with a fluid under pressure comprising, in combination, a base, a collet moveably mounted in said base, an actuator bar removeably connected to said collet for actuating said collet, a pair of balanced operator cylinders operatively connected to said actuator bar, said cylinders being balanced for applying an equal force to the bar, an accumulator connected to said operator cylinders, a valve controlling the flow of fluid into the operator cylinders and out of the operator cylinders, and return means for returning the collet to a release position when the operator cylinders are de-energized, whereby fluid under pressure is supplied to the operator cylinders through the valve thereby placing the collet in an actuating position, and the valve is closed to hold the collet in an actuating position, while the accumulator maintains the pressure in the operator cylinders.

6. A collet operator for use with a fluid under pressure comprising, in combination, a base having a top and a bottom, said base having an actuator bar recess in its bottom, a floor sealingly connected to the bottom of said base to close said recess, a collet moveably mounted in said base, said collet having a hollow center and a threaded portion at one end, said collet having a plurality of slots at the end adjacent the top of the base, an actuator bar positioned in the actuator bar recess and threadedly connected to the threaded portion of said collet, a pair of balanced operator cylinders operatively connected to said actuator bar, said cylinders being balanced for applying an equal force to the actuator bar, return means for returning the collet to a release position when the operator cylinders are de-energized, and a coolant inlet in said base for providing a coolant to the actuator bar recess and through the center of collet and the slots in the collet.

7. A collet operator for use with a fluid under pressure comprising, in combination, a base, a collet moveably mounted in said base, said collet having a threaded portion at one end, an actuator bar threadedly connected to the threaded portion of said collet, a nylon plug fixed in said actuator bar in engagement with the threaded portion of said collet to hold the collet relative to the actuator bar, a pair of balanced operator cylinders operatively connected to said actuator bar, said operator cylinders being balanced for applying an equal force to the actuator bar, and return means for returning the collet to a release position when the operator cylinders are de-energized.

8. A collet operator for use with a hydraulic fluid under pressure comprising, in combination, a base having a top and a bottom, said base having an actuator bar recess in its bottom, a floor connected to said base closing said actuator bar recess, a collet mounted in said base and cooperative with said base to provide a gripping action by the collet, said collet having a hollow center and a threaded portion at one end adjacent to the floor, an actuator bar positioned in the actuator bar recess and threadedly connected to the threaded portion of said collet, an adjustable stock stop mounted on the floor and aligned with the hollow center of the collet for positioning a work piece relative to the collet, a pair of balanced operator cylinders operatively connected to said actuator bar, said operator cylinders being balanced for applying an equal force to the actuator bar, and return means for returning the collet to a released position when the operator cylinders are de-energized.

9. A collet operator for use with a fluid under pressure comprising, in combination, a base having a top and a bottom, said base having an actuator bar recess in its bottom, a floor sealingly connected to said base closing the actuator bar recess, a collet moveably mounted in said base and cooperative with said base to provide a gripping action by the collet, said collet having a slotted head on one end, a threaded portion at the other end and a hollow center, said collet having its slotted head at the top of the base and its threaded portion adjacent to the floor, an actuator bar positioned in the actuator bar recess and threadedly connected to the threaded portion of the collet, a pair of balanced operator cylinders operatively connected ot said actuator bar, said operator cylinders being balanced for applying an equal force to the actuator bar, an accumulator connected to said pair of balanced operator cylinders, a valve controlling the flow of fluid into said operator cylinders and the accumulator, a coolant inlet port in said base communicating with the actuator bar recess to provide an inlet for coolant into the actuator bar recess and out along the hollow center of the collet and the slotted head, and return means for returning the collet to a release position and the operator cylinders are de-energized, whereby a fluid under pressure is supplied to the operator cylinders, the valve is closed to hold the collet in a gripping position and the accumulator maintains the pressure within the operator cylinders.

10. A collet operator for use with a fluid under pressure comprising, in combination, a base having a top and a bottom, said base having an actuator bar recess in its bottom, a collet having a slotted head at one end and a threaded portion at its other end mounted in said base with the head cooperative with the top of the base and the threaded portion adjacent to the bottom of the base, said collet having a hollow center, a floor sealingly mounted on the bottom of the base to close the actuator bar recess, an actuator bar positioned in the actuator bar recess and threadedly connected to the threaded portion of said collet, a pair of balanced operator cylinders operatively connected to said actuator bar, said cylinders being balanced for applying an equal force to the actuator bar, return means for returning the collet to a release position when the operator cylinders are de-energized, a coolant inlet connected to the actuator bar recess to provide a source of coolant into the actuator bar recess and up through the hollow collet and out through the slotted head of said collet, and an adjustable stock stop mounted on the floor aligned with the hollow center of the collet for regulating the position of a work piece in the collet relative to the collet.

11. A collet operator for use with a hydraulic fluid under pressure comprising, in combination, a base having a top and a bottom, said base having an actuator bar recess in its bottom, a collet moveably mounted in said base and cooperative with said base to provide a gripping action by the collet, said collet having a hollow center and a threaded portion at one end, a floor mounted on the bottom of said base covering the actuator bar recess, an actuator bar positioned in the actuator bar recess and threadedly connected to the threaded portion of said collet, a pair of balanced operator cylinders operatively connected to said actuator bar, said operator cylinders being balanced for applying an equal force to the actuator bar, an accumulator mounted in said base and being connected to the operator cylinders, a valve controlling the flow of hydraulic fluid to the operator cylinders and the accumulator, return means for returning the collet to a release position when the operator cylinders are de-energized, and an adjustable stock stop mounted on said floor aligned with the hollow center of the collet for adjusting the position of a work piece in the collet relative to said collet, whereby hydraulic fluid under pressure is provided to the operator cylinders thereby placing the collet in a gripping attitude, the valve is closed and the accumulator maintains the pressure in the operator cylinder.

12. A collet operator for use with a fluid under pressure comprising, in combination, a base, a collet moveably mounted in said base and cooperative which said base to provide a gripping action by the collet, said collet having a threaded portion at one end, an actuator bar threadedly connected to the threaded portion of said collet, a nylon plug fixed in said actuator bar in engagement with the threaded portion of said collet to hold the collet relative to the actuator bar, a pair of balanced operator cylinders operatively connected to said actuator bar, said operator cylinders being balanced for applying an equal force to the actuator bar, return means for returning the collet to a release position when the operator cylinders are de-energized, an accumulator operatively connected to the operator cylinders, and a valve controlling the flow of a hydraulic fluid into the operator cylinders and the accumulator, whereby hydraulic fluid under pressure is provided to the operator cylinders and the accumulator through the inlet valve, the inlet valve is closed and the operator cylinders are held under pressure by the accumulator.

13. A collet operator for use with a fluid under pressure comprising, in combination, a base having a top and a bottom, said base having an actuator bar recess in its bottom, a collet moveably mounted in said base for cooperation with the base to provide a gripping action by the collet, said collet having a slotted head positioned adjacent to the top of said base, said collet having a hollow center and a threaded portion at one end adjacent to the bottom of said base, an actuator bar positioned in the actuator bar recess and threadedly connected to the threaded portion of the collet, a floor sealingly mounted on the bottom of the base to close the actuator bar recess, an adjustable stock stop mounted on said floor and aligned with said collet for regulating the position of a work piece in said collet relative to said collet, a coolant inlet in said base opening into said actuator bar recess for providing a coolant to the recess to flow through the collet and out through the slotted head, a pair of balanced operator cylinders operatively connected to said actuator bar, said operator cylinders being balanced for applying an equal force to the operator bar, return means for returning the collet to a release position when the operator cylinders are de-energized, and an accumulator mounted in said base and being connected to the operator cylinders and an inlet valve controlling the flow of hydraulic fluid into the operator cylinders and the accumulator, whereby hydraulic fluid under pressure is provided to the operator cylinders and the accumulator to place the collet in a gripping attitude, the inlet valve is closed and the accumulator maintains the pressure of the hydraulic fluid in the operator cylinders.

14. A collet operator for use with a hydraulic fluid under pressure comprising, in combination, a base having a top and a bottom, said base having an actuator bar recess in its bottom, a collet moveably mounted in said base, said collet having a slotted head cooperative with said base to provide a gripping action by the head on a work piece, said collet having a hollow center and a threaded portion at one end, an actuator bar positioned in the actuator bar recess and being threadedly connected to the threaded portion of said collet, a nylon plug fixed to said actuator bar in engagement with the threaded portion of said collet to hold the collet relative to the actuaor bar, a floor sealingly mounted on the bottom of the base to seal closed the actuator bar recess, a stock stop mounted on said floor and being aligned with the collet for regulating the position of a work piece relative to the collet, a coolant inlet in said base opening into the actuator bar recess to provide a flow of coolant into the actuator bar recess and out of the base along the hollow center of the collet and through the slotted head of said collet, a pair of balanced operator cylinders operatively connected to said actuator bar, said operator cylinders being balanced for applying an equal force to the actuator bar, return means for returning the collet to a release position when the operator cylinders are de-energized, an accumulator mounted in said base and being operatively connected to said operator cylinders, and a valve controlling the flow of fluid into said operator cylinders and the accumulator, whereby hydraulic fluid under pressure is provided to the accumulator and the operator cylinders through the inlet valve thereby moving the collet into a gripping attitude, the inlet valve is closed, and the accumulator maintains the pressure in the operator cylinders.

15. A collet operator for use with a fluid under pressure comprising, in combination, a base, a collet moveably mounted in said base and cooperative with said base to provide a gripping attitude for the collet, an actuator bar removeably connected to said collet for actuating said collet, and a pair of balanced operator cylinders operatively connected to said actuator bar, said operator cylinders being balanced for applying an equal force to the operator bar.

16. A collet operator for use with a fluid under pressure comprising, in combination, a base, a plurality of slotted head collets moveably mounted in said base, an actuator bar removeably connected to each of said collets for actuating the collets, a pair of balanced operator cylinders operatively connected to each of said actuator bars, each of said pairs of balanced operator cylinders being balanced for applying an equal force to their respective actuator bars, and porting operatively connecting all of the operator cylinders.

17. A collet operator for use with a hydraulic fluid under pressure comprising, in combination, a base, a plurality of collets moveably mounted in said base and operatively engageable with said base to place the collets in a gripping attitude, an actuator bar removeably connected to each of said collets for actuating the respective collets, a pair of balanced operator cylinders operatively connected to each of said actuator bars, each pair of balanced operator cylinders being balanced for applying an equal force to its respective actuator bar, an accumulator being operatively connected to all of the operator cylinders, and an inlet valve controlling the flow of hydraulic fluid under pressure to the operator cylinders and the accumulator, whereby hydraulic fluid under pressure is provided to the operator cylinders and the accumulator through the inlet valve to place the collets in a gripping attitude, the inlet valve is closed and the pressure in the operator cylinders is maintained by the accumulator.

18. A collet operator for use with a hydraulic fluid under pressure comprising, in combination, a base, a plurality of collets moveable in said base and cooperative with said base to provide a gripping action by the collets, an actuator bar removeably connected to each of said collets for actuating each respective collet, a pair of balanced operator cylinders operatively connected to each of said actuator bars, each pair of operator cylinders being balanced for applying equal force to its respective actuator bar, return means cooperative with each of said actuator bars for returning the collet to a release position when the operator cylinders are de-energized, an accumulator operatively connected to each of the operator cylinders, a pressure indicating means operatively connected to the accumulator for indicating the pressure in the accumulator and the operator cylinders, and a valve controlling the flow of hydraulic fluid into the operator cylinders and the accumulator, whereby hydraulic fluid under pressure is provided to the accumulator and the operator cylinders through the valve to place the collets into a gripping attitude, the valve is closed and the accumulator maintains the pressure of hydraulic fluid within the operator cylinders.

19. A collet operator for use with a hydraulic fluid under pressure comprising, in combination, a base, a plurality of split head collets mounted in said base for co-operation with said base to provide a gripping action by the collets, an actuator bar removeably connected to each of the collets, each of said actuator bars including a pair of outwardly extending arms, a piston connected to each of said arms for forcing the collet into cooperation with the base to actuate a gripping action by the collet, each of said pistons being slideably mounted in a cylinder in the base, each of said pistons having a groove, an O-ring mounted in the groove of each of said pistons for sealing the space between each of the pistons and its respective cylinders, a cylinder port communicating with each of said cylinders, a longitudinal connecting port connecting one-half of the cylinder ports, a second longitudinal connecting port connecting the other half of the cylinder ports, a third connecting port in said base providing communication with the longitudinal connecting ports to equalize the pressure of a fluid in the cylinders, an accumulator port communicating with the third connecting port, an accumulator cylinder in said base communicating with the accumulator port, an accumulator piston slideably mounted in said accumulator cylinder, means constantly urging the accumulator pistons into the accumulator cylinders, an inlet port in said base connected to said third connecting port, and a valve connected to said inlet port controlling the flow of hydraulic fluid under pressure through the inlet port and into the accumulator cylinder and the other cylinders, whereby hydraulic fluid under pressure is provided through the inlet port and through the connecting port to the cylinders to place the collets in a gripping attitude, the inlet port is closed by the valve, and the pressure in the cylinders is maintained by the accumulator piston being urged into the accumulator cylinder.

20. A collet operator for use with a hydraulic fluid under pressure comprising, in combination, a base having a top and a bottom, said base having an actuator bar recess in its bottom, a plurality of collets mounted in said base, each of said collets having a slotted head, each of said slotted heads cooperative with the top of said base to provide a gripping action by each of said collets, each of said collets having a hollow center and a threaded portion at one end, an actuator bar being threaddedly connected with the threaded portion of each of said collets, each of said actuator bars being positioned in the actuator bar recess at the bottom of the base, a nylon plug fixed in each of the actuator bars in engagement with the respective threaded portion of the respective collet to hold the respective collet relative to the respective actuator bar, each of said actuator bars having a pair of outwardly extending arms, a guide mounted in each of said arms in engagement with the base to prevent rotation of the actuator bar relative to said base, a piston connected to each of said arms for forcing the respective collet into operative cooperation with the base to position the collet in a gripping attitude, each of said pistons being slideably mounted in a cylinder in the base, and each of said pistons having the same size as each other piston, each of said pistons having a groove an O-ring mounted in the groove of each of said pistons for sealing the space between each of the pistons and its respective cylinder, a cylinder port communicating with each of said cylinders and extending to the top of said base, a cylinder port plug closing the end of each of the cylinder ports at the top of the base, a longitudinal connecting port in said base connecting one-half of the cylinder ports, a second longitudinal connecting port connecting the other half of the cylinder ports, a third connecting port connecting the two longitudinal connecting ports to provide communication among all of the cylinder ports to equalize the pressure of a fluid in the cylinders, a pressure indicating means mounted on the base and communicating with the third connecting port, an inlet port in said base connected to the first-mentioned longitudinal connecting port, a valve connected to said inlet port for controlling the flow of hydraulic fluid through the inlet port, an accumulator port communicating with the two longitudinal connecting ports, an accumulator cylinder in said base communicating with the accumulator port, accumulator pistons slideably mounted in said accumulator cylinder, said accumulator pistons having a groove, an accumulator O-ring mounted in the groove of said accumulator piston for sealing the space between the accumulator piston and the accumulator cylinder, a plate connected to said piston, said plate being moveable with the piston, a constant force spring engaging the plate and constantly urging the accumulator piston into the accumulator cylinder, a floor mounted in sealing engagement with the bottom of the base to close the accumulator bar recess, a return spring mounted in engagement with each of the arms of each of the accumulator bars and the floor for constantly urging the accumulator bar toward the top of the base to move the respective collets into a release position, a peg cooperative with each of said springs mounted in the floor to maintain the springs in position in engagement with the respective arms of the respective accumulator bars, a plurality of lugs equal in number to the number of collets sealingly threadedly mounted in the floor, each of said plugs being aligned with its respective collet, a threaded riser adjustably mounted in the plug for regulating the position of a work piece relative to its respective collet, and a coolant inlet mounted in said base and communicating with the actuator bar recess, whereby a hydraulic fluid under pressure is supplied to the inlet port and to the operator cylinders and the accumulator cylinder, thereby extending the pistons against their respective springs to move the collets into a gripping attitude, the valve is closed, and the accumulator piston is constantly urged into the accumulator cylinder by the constant force spring to maintain a constant pressure in the cylinders thereby maintaining the collets in a gripping attitude.

References Cited in the file of this patent

UNITED STATES PATENTS

| | | |
|---|---|---|
| 2,186,236 | Dearborn | Jan. 9, 1940 |
| 2,383,094 | Walder | Aug. 21, 1945 |
| 2,461,292 | Mead | Feb. 8, 1949 |
| 2,504,186 | De Munck | Apr. 18, 1950 |
| 2,620,196 | Church | Dec. 2, 1952 |
| 2,860,881 | Perrachione | Nov. 18, 1958 |